Sept. 19, 1961  R. F. WHITE  3,000,014
FLIGHT SUIT DISCONNECT
Filed Feb. 18, 1959

INVENTOR.
RANDALL F. WHITE
BY
ATTORNEYS

United States Patent Office 3,000,014
Patented Sept. 19, 1961

3,000,014
FLIGHT SUIT DISCONNECT
Randall F. White, Downey, Calif., assignor, by mesne assignments, to the United States of America as represented by the Secretary of the Navy
Filed Feb. 18, 1959, Ser. No. 794,215
8 Claims. (Cl. 2—270)

This invention relates to full-pressure flight suits, and more particularly, to a disconnect for the separable joints of such a suit.

One of the well-known hazards in high altitude aircraft and space flights is the rapid reduction of pressure on the body surface of the occupants with increasing altitude.

A partial solution to this problem has been the development of pressurized cabins and cockpits. However, since the pressure can be lost due to flame out or to an accidental blowout or puncturing of the cabin, or should the pilot be forced to bail out, the need for individual pressure flight suit protection is apparent.

As can be expected, many different pressure flight suits have been developed, however, one important requirement has restricted progress, namely, mobility. To be effective, a pressure suit, besides the basic requirement of affording protection, must provide the pilot with the necessary freedom of motion at the various body joints to perform his complex tasks, as well as being comfortable during sitting, standing, and walking. Furthermore, in the event of ditching, the suit must afford the occupant mobility for survival in water, which may include removal of the suit. In addition, mobility ensures comfort which is an important consideration in this type of environment.

The present invention is particularly suitable as a disconnect for the wrist of a separable glove, being one of the most active body joints. This disconnect is readily separable and enables the glove to be readily rotated with respect to the sleeve of the garment while sealed from the egress of air and the ingress of water.

The disconnect includes a semiflexible bushing or tube sewn or otherwise attached to one of the suit members, such as the sleeve. The bushing is formed with one or more spaced annular external shoulders between which are disposed one or more retaining and sealing rings. The bushing and the retaining ring are constructed of preferably a semiflexible plastic, such as "Teflon," which material has a low coefficient of friction enabling free rotation between the assembled suit members. The open end of the glove cuff is provided with a clamping means whereby the cuff is snugly attached around the retaining ring. Sealing rings or lips coact between the glove and bushing to prevent the ingress of water and egress of air.

A principal object of this invention is to provide a disconnect for the joints of a high altitude flight suit having maximum mobility and being sealable from water and air.

Another object is to provide a glove disconnect which is sufficiently flexible to be distorted to enable the hand to be passed therethrough resulting in a disconnect of smaller diameter and less weight.

Other objects and many of the attendant advantages of this invention will be readily appreciated as the same becomes better understood by reference to the following detailed description when considered in connection with the accompanying drawings wherein.

Figure 1:
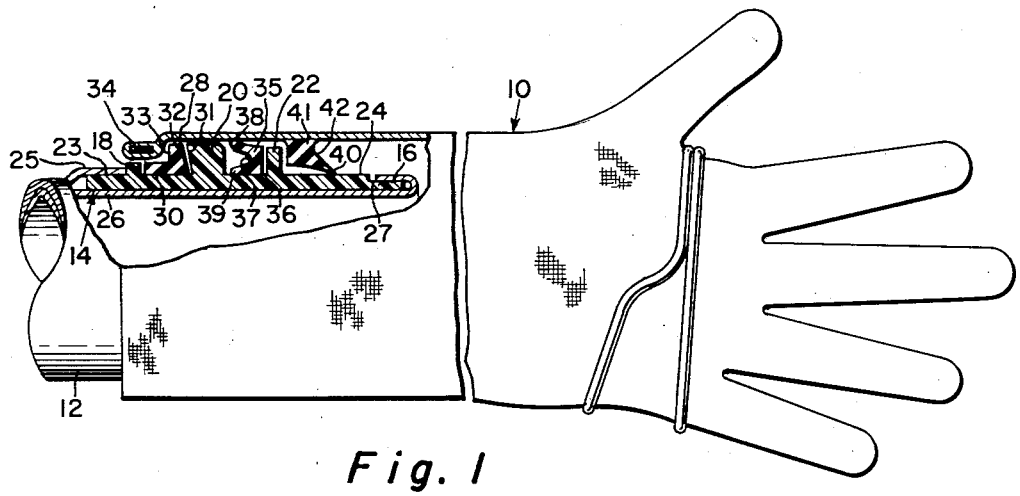
FIG. 1 is a plan view, having a partially enlarged section, of a glove attached to the sleeve of a flight suit by the novel disconnect of this invention.

Referring to the drawing where like reference numerals refer to similar parts throughout the views there is shown in FIG. 1, a glove 10 attached to a sleeve 12 of a full-pressure flight suit through a novel disconnect which forms the subject matter of the present invention.

Figure 2:
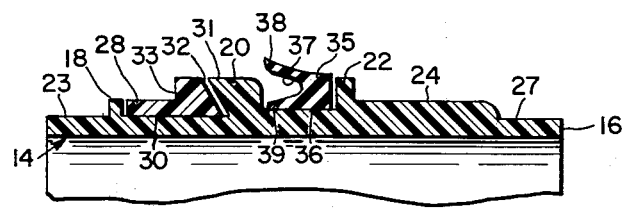
FIG. 2 is an enlarged cross-sectional view of the disconnect with the retaining and sealing rings assembled on the bushing.

A disconnect 14 of the embodiment of FIGS. 1 and 2 comprises a tube or bushing 16 of semiflexible material, preferably of plastic material having self-lubricating qualities, such as "Teflon" made by E. I. duPont de Nemours and Company, Inc., Wilmington, Delaware, and having satisfactory machining characteristics. Bushing 16 is flexible to permit squeezing into elliptical shape to facilitate the insertion of the palm portion of the hand. Thus, for a given size hand, the disconnect can be made smaller, and, therefore, lighter in weight and less bulky which are important considerations in equipment of this type.

Bushing 16 has integrally formed a plurality of externally spaced annular shoulders, the embodiment of FIGS. 1 and 2 having three shoulders, namely, 18, 20, and 22, and smooth end portions 23 and 24. Bushing 16 is secured to sleeve 12 by lapping each layer 25, 26 of the sleeve over a respective end portion and bonding, sewing, or otherwise fastening the layers thereto as shown in FIG. 1. Inner layer 26 extends along the bore of the bushing and terminates in a recess 27 in end portion 24 leaving a substantial remainder of the end portion for sealing engagement with the glove as hereinafter described.

Glove 10 is anchored to the sleeve through a retaining ring 28 freely disposed in a channel 30 formed between shoulders 18 and 20. The aft wall of shoulder 20 and the forward wall of ring 28 having complementary bearing surfaces 31 and 32, respectively, which may be beveled, that resist longitudinal separation of the assembled glove and sleeve while permitting free rotation therebetween. Ring 28 is made of the same material as bushing 16, preferably "Teflon" for its self-lubricating characteristics, the ring being sufficiently resilient to be snap-fitted on the bushing over shoulder 18. A step 33 is provided around the periphery of ring 28 for seating a clamping strap 34, or the like threaded through a peripheral passage in the glove mouth. The strap in a closed position retains the glove on the sleeve and has an overcenter latch (not shown) to facilitate the clamping and unclamping action.

Figure 4:
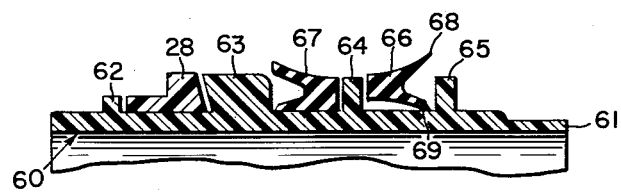
FIG. 4 is an enlarged cross-sectional view of still another modified disconnect wherein both sealing lips are individual rings.

Sealing the disconnect from the ingress of water and the egress of air within the suit is accomplished by a plurality of sealing lips one or more of which may be formed as an integral portion of the glove (FIG. 1); integral with the bushing (FIG. 3); or as a separate element, such as a ring (FIGS. 2 and 4). In FIGS. 1 and 2, a sealing ring 35 is disposed in an annular channel 36 formed between shoulders 20 and 22, and is made preferably of a pliable synthetic water seal material, being resilient for snap-fitting over bushing 16. Ring 35 has a lateral annular groove 37 facing shoulder 20 forming opposite lips 38 and 39, the former adapted to contact the inside wall of glove 10 and the latter adapted to contact the base of channel 36, both in sealing relation. Lip 38 is flared beyond the peripheral surface of bushing 16 and ring 28 so as to be compressed by the cuff of the glove. The pressure of any water seeping into the glove mouth tends to force the lips apart and increase the sealing engagement between the respective parts.

In FIGS. 1 and 2 egress of the air from the glove, the suit being a full-pressure suit, is accomplished by a resilient sealing lip 40 formed on a shoulder 41 integral with the inner wall of the glove. Lip 40 is flared inwardly the glove interior, opposite to the direction of lips 38 and 39, and is adapted to engage end portion 24 of the bushing and prevent the escape of air. Lip 40 forms a recess 42 open to the glove interior and the air pressure therein supplements the resiliency of the lip in maintaining the seal, similar to the effect of water pressure on lip 38. Shoulder 41 also serves to abut shoulder 22 on the bushing to restrain any further inward movement of the glove over the sleeve, locking the glove in position in cooperation with retaining ring 28.

Figure 3:
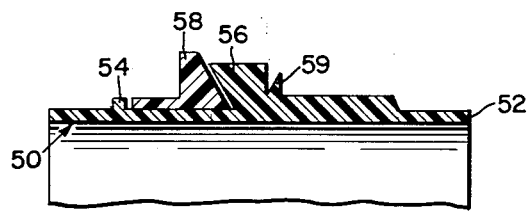
FIG. 3 is an enlarged cross-sectional view of a modified disconnect wherein one of the sealing rings is incorporated as an integral lip on the bushing.

A modified disconnect 50 is shown in FIG. 3 differing from the prior embodiment in that bushing 52 is provided with only two shoulders 54 and 56 for housing a retaining ring 58, similar to retaining ring 28 in FIGS. 1 and 2. A water sealing lip 59 is formed integral with bushing 52 instead of being a separate member as ring 35 in FIGS. 1 and 2. The means for air sealing and attachment of the glove may be identical to that previously described in FIGS. 1 and 2.

Another modified disconnect 60 is disclosed in FIG. 4 wherein bushing 61 is provided with four spaced shoulders 62, 63, 64, and 65. This disconnect is substantially identical to the modification in FIGS. 1 and 2 except for the addition of a fourth shoulder 65. Shoulder 65 is spaced from shoulder 64 to accommodate an air sealing ring 66 being a separate element not integral with the glove as sealing lip 40 in the first two modifications. Air sealing ring 66 is configured similar as water sealing ring 67 disposed between shoulders 63 and 64, and water sealing ring 35 of FIGS. 1 and 2, but faces an opposite direction, namely, toward the interior of the glove. Air sealing ring 66 being ring shaped is provided with opposite sealing lips 68 and 69 that engage the interior wall of the glove and the bushing, respectively.

The present invention provides a separate disconnect for a full pressure flight suit which is simple, comfortable, lightweight, and has maximum mobility; while being effectively sealed from the entrance of water and the escape of air.

Obviously many modifications and variations of the present invention are possible in the light of the above teachings. It is therefore to be understood that within the scope of the appended claims the invention may be practiced otherwise than as specifically described.

I claim:
1. A disconnect for detachably connecting a flexible tubular appendage member telescopically to a flexible tubular body member of a flexible pressure flight suit comprising a semiflexible bushing adapted to be attached to one of said members and having an annular external shoulder, said bushing capable of being flexed into an oval cross-sectional configuration to facilitate entry of an appendage of the occupant of the suit, a semiflexible retaining ring concentrically mounted around said bushing, said ring and shoulder having complementary bearing surfaces tending to resist longitudinal separation while permitting relative rotation, and elongate expandable means adapted to be connected to and extending around the periphery of another of said members for detachably clamping said ring against the bushing in rotatable relation.

2. The disconnect of claim 1 wherein said bushing and ring are constructed of a plastic material having a low coefficient of friction.

3. The disconnect of claim 1 wherein said bushing terminates in thin walled sections at both ends, capable of being sewn to the respective suit member.

4. A pressure flight suit having a wrist disconnect for detachably connecting a flexible glove member telescopically to a flexible sleeve member of the suit comprising a semiflexible bushing attached to said sleeve, said bushing capable of being flexed to an oval cross-sectional configuration to facilitate passage of the hand of an occupant, said bushing having an annular external shoulder, a semiflexible retaining ring concentrically mounted around said bushing, said ring and shoulder having complementary bearing surfaces tending to resist longitudinal separation and being made of material having self-lubricating properties to permit relative rotation therebetween, a plurality of annular sealing means disposed between said bushing and said glove for preventing the ingress of water and the egress of air through said disconnect, and elongate expandable means extending around the periphery of the glove mouth for clamping said glove to the retaining ring in rotatable relation to the bushing.

5. The flight suit of claim 4 wherein said sealing means is an integral lip on said shoulder and extending from a side opposite the bearing surface.

6. The flight suit of claim 4 wherein said sealing means is a pair of rings positioned between the glove and the bushing.

7. The flight suit of claim 4 wherein said sealing means includes a lip formed integral with the glove for engaging the bushing.

8. A pressure flight suit having a multilayered flexible sleeve member and a flexible glove member, said glove member having a cuff portion immediately adjacent a mouth of the glove through which the hand of the occupant is positioned a disconnect for detachably and rotatably connecting said members together with the cuff portion encircling the sleeve member, comprising a semiflexible bushing having thin end wall sections attached to the sleeve layers, said bushing capable of being flexed into an oval cross-section to facilitate passage of the hand said bushing having at least three spaced external shoulders forming two annular grooves, two pliable rings concentrically mounted on said sleeve each disposed in one of said grooves, one of said rings and an intermediate shoulder having complementary bearing surfaces tending to resist longitudinal separation of the members, said one ring and bushing being made of material having self-lubricating properties to permit relative rotation, and means extending around the periphery of the glove mouth for clamping said rings between the glove and the bushing in rotatable relation, said second ring having an annular lip for engaging a surface on said glove cuff and forming a water seal to prevent ingress to the suit, a second sealing lip disposed between said glove cuff and the bushing and forming an air seal to prevent egress of air from said suit.

References Cited in the file of this patent
UNITED STATES PATENTS

| | | |
|---|---|---|
| 1,146,781 | Bowdoin | July 20, 1915 |
| 2,567,773 | Krupp | Sept. 11, 1951 |
| 2,729,474 | Unger | Jan. 3, 1956 |
| 2,846,240 | Beyer | Aug. 5, 1958 |
| 2,911,237 | Olson | Nov. 3, 1959 |